United States Patent

Vossmann et al.

Patent Number: 5,586,833
Date of Patent: Dec. 24, 1996

[54] ARTICULATED FITTING FOR SEATS WITH ADJUSTABLE BACKREST, IN PARTICULAR MOTOR VEHICLE SEATS

[75] Inventors: Gregor Vossmann, Vreden; Dirk Angermann, Cologne, both of Germany

[73] Assignee: Keiper Recaro GmbH & Co., Remscheid, Germany

[21] Appl. No.: 337,681

[22] Filed: Nov. 10, 1994

[30] Foreign Application Priority Data

Nov. 30, 1993 [DE] Germany ................ 43 40 696.3

[51] Int. Cl.$^6$ ................ B25G 3/28; B60N 2/02; F16H 1/32; F16B 3/00
[52] U.S. Cl. ................ 403/359; 403/298; 403/345; 297/361.1; 297/362; 475/176; 475/177
[58] Field of Search ................ 403/359; 297/361.1, 297/362; 475/176, 177

[56] References Cited

U.S. PATENT DOCUMENTS

| | | | |
|---|---|---|---|
| 4,781,416 | 11/1988 | Johnson et al. | 297/362 |
| 4,827,800 | 5/1989 | Pedersen et al. | 74/805 |
| 4,916,962 | 4/1990 | Tsutsumi et al. | 74/392 |
| 5,213,437 | 5/1993 | Sommer | 403/359 |

*Primary Examiner*—Blair Johnson
*Assistant Examiner*—Bruce A. Lev
*Attorney, Agent, or Firm*—McAulay Fisher Nissen Goldberg & Kiel, LLP

[57] ABSTRACT

Articulated fitting for seats having an adjustable backrest, in particular motor vehicle seats. The articulated fitting arranged on each longitudinal side of a seat has a stationary articulated part associated with the seat part and a swivelable articulated part associated with the backrest, these articulated parts being connected with one another via a swivel axle. The position of the two articulated parts relative to one another is determined by an adjusting and fixing device constructed as a gear unit. The swivel axle has an eccentric portion for supporting one articulated part and the swivel axle of each articulated fitting has a central receptacle serving to connect with a transmission rod so as to be fixed with respect to rotation relative thereto, which transmission rod couples the two articulated fittings of a seat with one another. In order to eliminate faulty assembly by means of determining visually whether or not the angular positions of the articulated parts of the two articulated fittings conform to one another, these articulated parts being connectable with the backrest, the transmission rod and the recess of the swivel axle which receives the transmission rod so as to be fixed with respect to rotation relative thereto have a profile cross section in the shape of a polygonal or toothed circumference having a missing corner or tooth, as the case may be, at a location on the circumference, this location being reduced to the core cross section of the transmission rod so that the transmission rod may be inserted into the recess of the swivel axle after a complete revolution of 360 degrees.

10 Claims, 3 Drawing Sheets

FIG. 3
FIG. 4
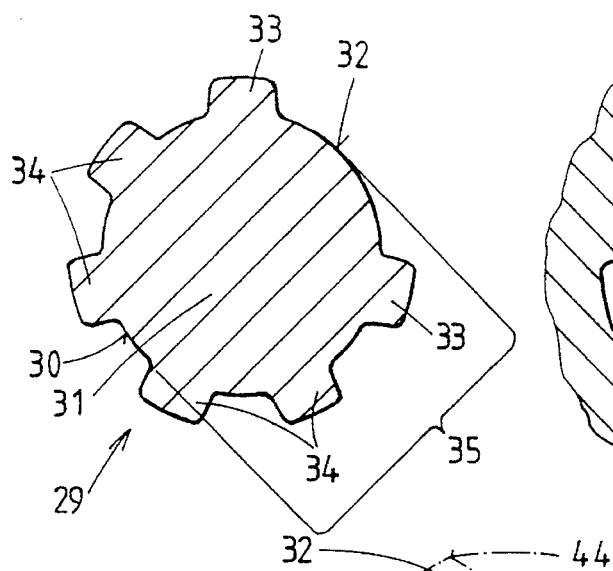
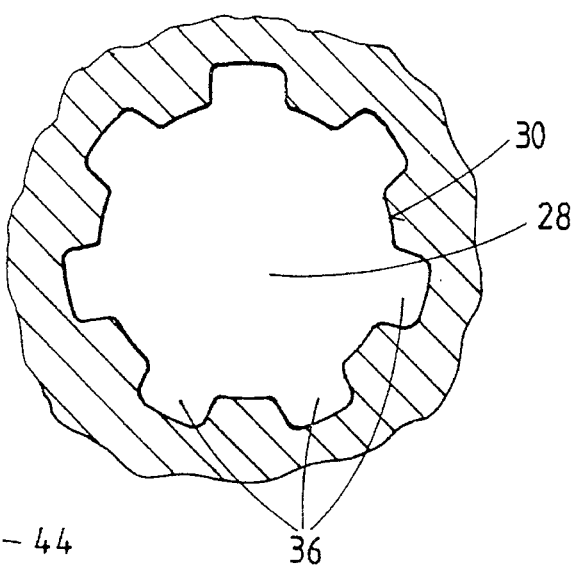
FIG. 6
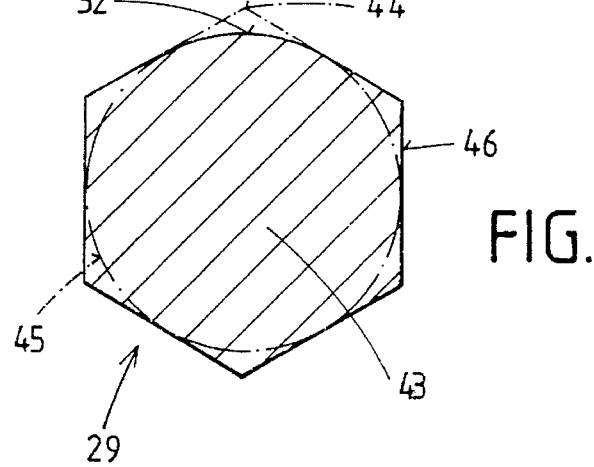
FIG. 7
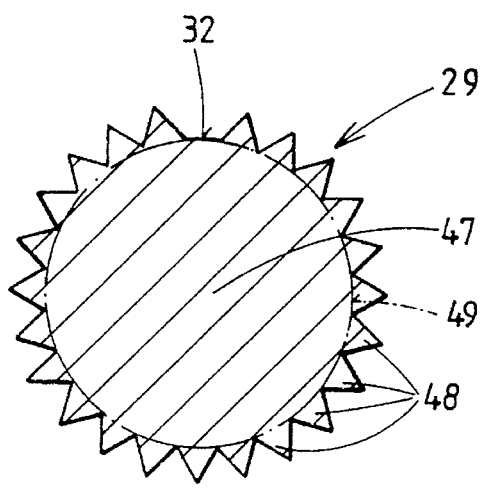
FIG. 5
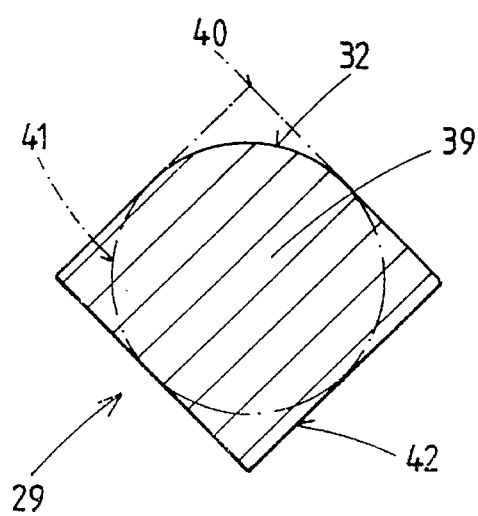

ARTICULATED FITTING FOR SEATS WITH ADJUSTABLE BACKREST, IN PARTICULAR MOTOR VEHICLE SEATS

BACKGROUND OF THE INVENTION a) Field of the Invention

The invention is directed to an articulated fitting for seats with an adjustable backrest, in particular motor vehicle seats, in which a stationary articulated part associated with the seat part and a swivelable articulated part associated with the backrest are connected with one another via a swivel axle, with an adjusting and fixing device which determines the position of both articulated parts relative to one another and is constructed as a gear unit. The swivel axle of each articulated fitting has a central receptacle serving to connect with a transmission rod so as to be fixed with respect to rotation relative thereto, which transmission rod couples the two articulated fittings of a seat with one another.

b) Description of the Related Art

DE 30 13 304 C2 describes an articulated fitting of the type mentioned above in which the swivel axle has a cam portion or eccentric portion serving to support an articulated part. The eccentric portion is formed by two wedge segments which are inclined relative to one another and embrace regions of a driver of the swivel axle, as well as by a driver arm engaging between the narrow sides of the wedge segments, and by an energy accumulator which presses the wide sides of the wedge segments away from one another. The driver for the wedge segments is constructed as a disk or plate and is connected with the swivel axle portion so as to be fixed with respect to rotation relative thereto, e.g., by means of a press fit, shrink fit or the like. The disk-like driver can have integrally formed driver projections. In order to transmit torque from the articulated fitting arranged on one longitudinal side of the seat to the articulated fitting arranged on the opposite longitudinal side of the seat, a transmission rod is provided which engages in a non-circular recess of the swivel axle and accordingly couples the swivel axles of the two articulated fittings so as to transmit torque. In this prior solution, the recesses of each swivel axle are formed by a pocket hole with a hexagonal cross section into which the ends of a transmission rod can be inserted, these ends having an identical cross section.

When assembling the seat, i.e., when connecting the two articulated fittings on either longitudinal side of the seat by means of the transmission rod, the articulated part which is connectable with the backrest on one longitudinal side of the seat may be angularly offset relative to the articulated part which is connectable with the backrest and arranged on the opposite longitudinal side of the seat due to a nonuniform position of the swivel axles with respect to their angle of rotation. This angular offset is not noticed by the person assembling the seat because the angular discrepancy is too slight to be detected without auxiliary means. In this context, it is noted that in articulated fittings of the present type a 360-degree revolution of the swivel axle produces an angular displacement of roughly 10 to 12 degrees of the articulated part which is connectable with the backrest.

OBJECT AND SUMMARY OF THE INVENTION

Since an angular displacement of the articulated parts relative to one another is visible, the primary object of the present invention is to provide a connection cross section of the transmission rod and recess of the swivel axle which allows a faulty assembly to be detected immediately and in which the receiving cross section of the driving element which is connectable with the transmission rod can remain completely symmetrical at the same time.

This object is met, according to the invention, in that the transmission rod and the recess of the swivel axle which receives the latter so as to be fixed with respect to rotation relative thereto have a profile cross section in the shape of a polygonal or toothed circumference having a missing corner or tooth, as the case may be, at a location on the circumference, this location on the circumference being reduced to the core cross section of the transmission rod so that the transmission rod may be inserted into the recess of the swivel axle after a complete revolution of 360 degrees.

Since such a construction of the cross section of the transmission rod and recess allows these two structural component parts to be connected together only after a complete revolution of 360 degrees, the person assembling the seat can immediately determine whether or not the articulated parts are aligned with one another or whether the swivel axle of one of the two articulated fittings should be rotated forward or backward. In the simplest case, the transmission rod can have a square cross section with a missing corner, where the circumference of the cross section follows a core circle and the sides of the square are tangential to this core circle, and the cross section of the recess of the swivel axle is constructed so as to match the cross section of the transmission rod.

Although it is possible to select different polygonal shapes for the cross section of the transmission rod and recess of the swivel axle, it may be advantageous in order to achieve a practicable solution to provide the transmission rod with a hexagonal cross section, where one corner of the hexagon is removed and the circumference of the cross section follows a core circle at this location, the sides of the hexagon being tangential to this core circle and the cross section of the recess of the swivel axle being constructed so as to match the cross section of the transmission rod.

Aside from the polygonal construction of the transmission rod and swivel axle recess, it is also conceivable to construct the transmission rod as a serrated shaft in which one serration is omitted and the serrated shaft is constructed at this location as a circular arc which is identical to the base circle of the serration, and the cross section of the recess of the swivel axle is constructed so as to match the cross section of the transmission rod.

Finally, it is also possible to construct the transmission rod as a spline shaft instead of the construction of the transmission rod mentioned above, wherein, at a location on the circumference, the center distance of two adjacent tooth strips corresponds to twice the spacing distance of the rest of the strips, and wherein the key slots or grooves of the recess of the swivel axle are arranged in the same manner as the tooth strips of the spline shaft to receive these tooth strips. In so doing, instead of using pocket holes for the recess of the swivel axle, it is also possible for the recess of the swivel axle to penetrate a hub of the driver for insertion of the transmission rod.

For the purpose of driving the swivel axles by means of the transmission rod, the recess in the hub of the driving member can be provided with the whole, unaltered profile cross section in the form of a polygonal inner circumference having all of its corners or a toothed inner circumference having all of its teeth. In this way, it is possible to connect the transmission rod with the driving member in an optional rotational angle position.

The invention is shown in the drawing with reference to an embodiment example and is explained more fully in the following.

BRIEF DESCRIPTION OF THE DRAWINGS

In the drawings:

FIGS. 3 shows the cross section of the transmission rod shown in FIG. 1 which is constructed as a spline shaft;

FIG. 4 shows the cross section of the bore hole of a driving member such as a handwheel, gear wheel or the like which can be slipped onto the transmission rod shown in FIG. 3;

FIG. 5 shows the alternative cross section of a polygonal transmission rod formed by a square rod;

FIG. 6 shows another alternative cross section of a polygonal transmission rod formed by a hexagonal rod; and FIG. 7 shows another alternative cross section of a transmission rod which is shaped as a serrated shaft with an omitted tooth.

DESCRIPTION OF THE PREFERRED EMBODIMENTS

Figure 1:
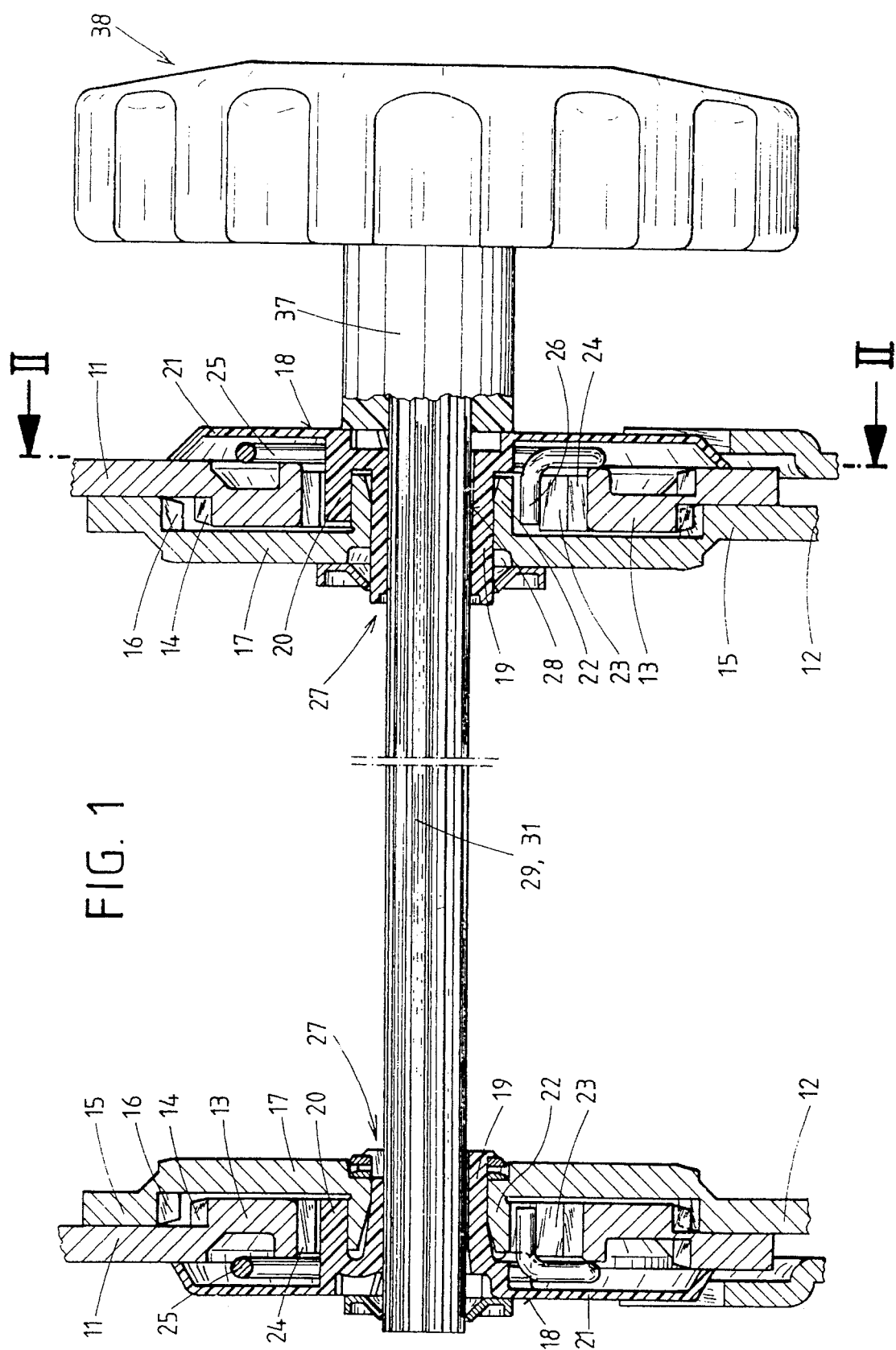
FIG. 1 is a view in longitudinal section of the two articulated fittings which are arranged on each longitudinal side of the seat and connected with one another by a transmission rod.
Figure 2:
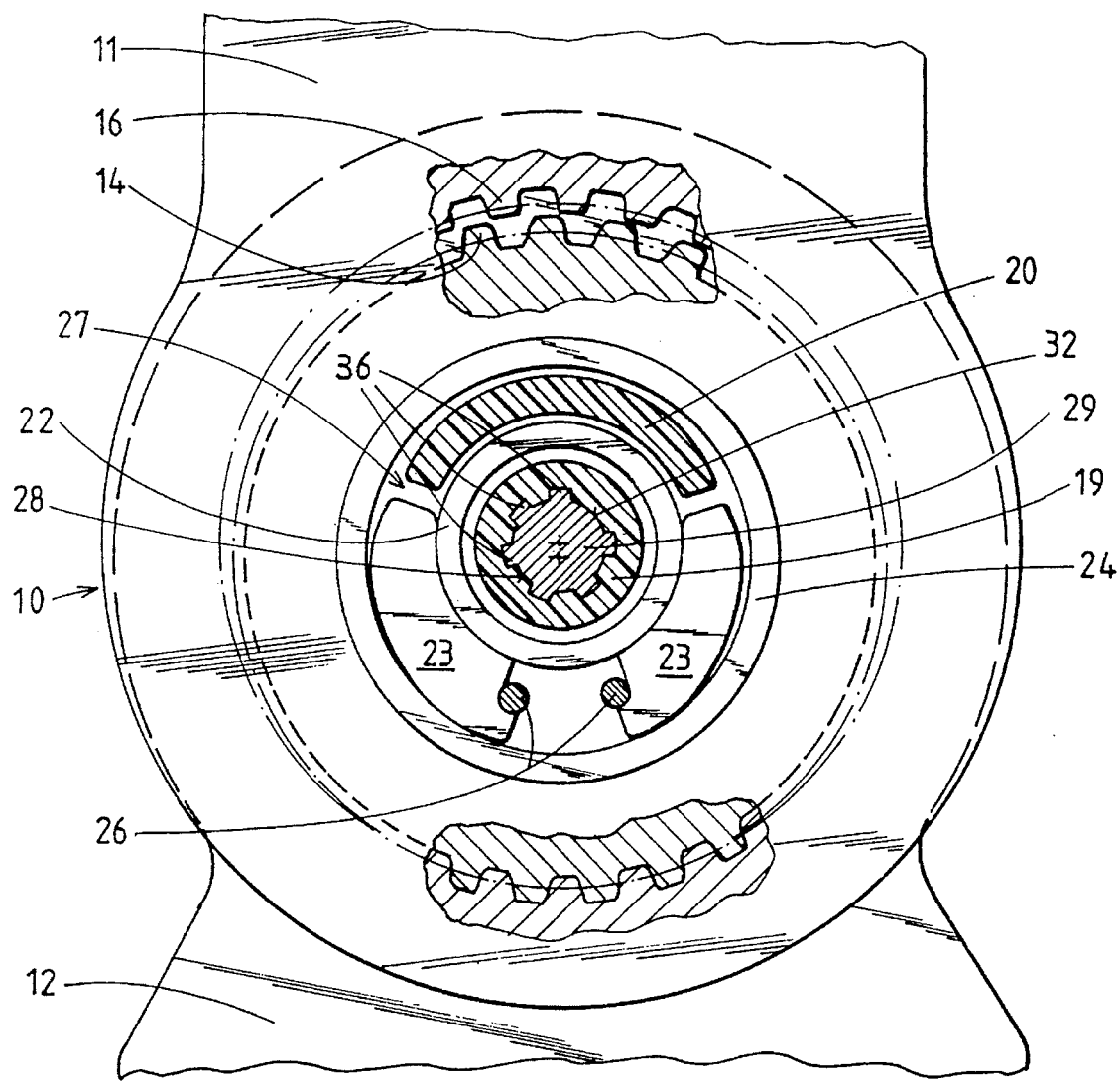
FIG. 2 shows one of the two articulated fittings in a sectional view according to line II—II of FIG. 1.

In the articulated fitting shown as an embodiment example in FIGS. 1 and 2, the articulated part 11 which is connectable with the backrest is swivelably connected, via an adjusting and fixing device constructed as a gear unit, with the articulated part 12 which is rigidly connected to the seat part. This adjusting and fixing device comprises a spur gear 13 which is formed, e.g., by stamping out of the articulated part 11 and has an external toothing 14 which meshes with the internal toothing 16 of a gear rim 15 of the articulated part 12, which gear rim 15 can also be formed, e.g., by stamping. The diameter of the outside circle of the external toothing 14 is smaller than the diameter of the base circle of the internal toothing 16 by at least the whole depth of a tooth. Accordingly, the difference in the number of teeth between the toothings 14 and 16 is at least one tooth, the internal toothing 16 having a greater number of teeth than the external toothing 16.

In the present embodiment example, the arrangement is selected in such a way that the external toothing 14 of the articulated part 11 can roll along the internal toothing 16 of the articulated part 12. The disk 17 of the articulated part 12 which is stamped out by the formation of the internal toothing 16 supports the hub 19 of a driver 18 by means of a drawn collar 22. The driver 18 overlaps portions of the drawn collar 22 of the articulated part 12 by a circular-arc-shaped driver 20 and engages in the intermediate space between two wedge segments 23 which are supported by their inner sides on the drawn collar 22 and, at their outer sides, contact a bearing ring 24 which is held in the articulated part 11. At its outer side, the driver 18 has a cover disk 21 which overlaps the articulated region.

While the narrow sides of the wedge segments 23 face the driver arm 20, the wide sides of the wedge segments 23 are pressed apart by the legs 26 of an annular spring 25 so as to eliminate play, particularly at the point of engagement of the external toothing 14 and internal toothing 16. When the driver arm acts upon the narrow side of a wedge segment 23 in one rotating direction during the adjusting movement, the displacement of this narrow side creates a play which facilitates the adjusting movement. This play is eliminated by the action of the annular spring 25 when the adjusting movement is interrupted. However, the eccentric portion produced by the wedge segments 23 at the driver 18 can also be formed by a cam disk integrally formed on a swivel axle by dispensing with the elimination of play.

The hub 19 of the driver 18 associated with the swivel axle 27 is penetrated along its entire length by a recess 28 for receiving a transmission rod 29 which connects the two articulated fittings with one another so as to transmit torque. In the embodiment example shown in FIGS. 1 to 3, the recess 28 and the transmission rod 29 both have a profile cross section in the shape of a toothed circumference 30; that is, the transmission rod 29 is constructed as a spline shaft 31. However, at one location 32 on the circumference of this spline shaft 31, the center distance of two adjacent tooth strips 33 is selected in such a way that this distance corresponds to twice the spacing distance of the rest of the strips 34 from one another. Accordingly, the transmission rod 29 is reduced to its core cross section 35 at this circumferential location 32. In conformity with the profile cross section of the transmission rod 29, the grooves 36 of the recess 28 in the hub 19 of the driver 18 are also arranged in the same manner as the tooth strips 33 of the spline shaft 31. Accordingly, the transmission rod 29 can always only be inserted into the recess 28 in the driver 18 forming the swivel axle 27 at a determined angular position or only after a complete revolution, so that a discrepancy between the angular positions of the articulated parts 11 is immediately visible during assembly and can therefore be corrected.

FIG. 4 shows the recess 28 in the hub 37 of the driving member 38, which recess 28 is profiled in the manner of a spline shaft. As can be seen from FIG. 1, the driving member 38 can be formed, e.g., by a hand wheel. However, it is also possible to use a structural component part (gear wheel) of an electric-motor drive as driving member 38. The recess 28 of the driving member 38 having the spline shaft configuration has the full number of grooves 36 in a uniformly distributed arrangement along the circumference so that, in particular, there is also a groove 36 at the location 32 on the circumference of the transmission rod 29 where a tooth strip is omitted. Accordingly, the driving member 38 can be attached to the transmission rod 29 in any position corresponding to the tooth spacing.

The shape of the transmission rod 29 and recess 28 is not limited to the embodiment example shown in FIGS. 1 to 4. Rather, it is also possible, for example, to furnish the transmission rod 29 and recess 28 with a modified cross section. For example, the transmission rod 29 may be provided with a square cross section 39 as shown in FIG. 5. However, one of the teeth 40, which are formed by corners of the square cross section 39, is removed and the circumference of this square cross section 39 follows a core circle 41 at this location 32 on the circumference, the sides 42 of the square being tangential to this core circle 41. It will be understood that, in this case, the recess 28 of the swivel axle 27 is constructed so as to correspond to the modified square cross section of the transmission rod 29.

Instead of a square cross section, the transmission rod 29 can also have a hexagon cross section 43 as shown in FIG. 6, one of the teeth 44, which are formed by corners of the hexagon cross section 43, is likewise removed and in which the circumference follows a core circle 45 at this location 32, the sides 46 of the hexagon being tangential to this core circle 45. In this instance, the cross section of the recess 28 of the swivel axle 27 is likewise constructed so as to correspond to the hexagon cross section 43 of the transmission rod.

In an embodiment form of the transmission rod 29 shown in FIG. 7, this transmission rod 29 is constructed as a serrated shaft 47 in which one of the teeth 48, which are formed by serrations of the shaft 47, is omitted at a location 32 on the circumference and the transmission rod 29 has at this location 32 a circular arc identical to the base circle 49 of the serrations. It will be understood that the cross section of the recess 28 of the swivel axle 27 is also constructed in this instance so as to correspond to the cross section of the transmission rod 29 and is accordingly likewise serrated with the omission of one serration.

The use of the cross sections of the transmission rod 29 and recess 28 shown in FIGS. 5 to 7 presents no difficulties when the structural component parts are manufactured from metal and, in particular, steel. When plastic is used for the driver and the hub associated with the latter, it is advantageous to use the profile cross section shown in FIG. 3.

As was already mentioned, the embodiment forms described and shown above are only examples illustrating the subject of the present invention which is in no way limited to these examples. Rather, there are many conceivable modifications and different constructions of the subject matter of the invention. In particular, all of the novel features mentioned in the description and/or shown in the drawings are substantial to the invention, even when not expressly claimed in the patent claims.

What is claimed is:

1. In an articulated fitting for seats having an adjustable backrest, in particular motor vehicle seats, in which a stationary articulated part associated with the seat part and a swivelable articulated part associated with the backrest are connected with one another via a swivel axle, having an adjusting and fixing device which determines the position of both articulated parts relative to one another and is constructed as a gear unit, the swivel axle of each articulated fitting having a central recess or receptacle serving to connect with a transmission rod so as to be fixed with respect to rotation relative thereto, which transmission rod couples the two articulated fittings of a seat with one another, the improvement comprising:

that the transmission rod and the recess of the swivel axel, which recess receives the transmission rod so as to be fixed with respect to rotation relative thereto, have a profile cross section in the shape of a toothed circumference, where said teeth are evenly spaced about said circumference and said circumference has a missing tooth which defines a double space between two adjacent teeth at a location on the circumference, this location on the circumference being reduced to a core cross section of said transmission rod so that the transmission rod may be inserted into the recess of the swivel axel after a complete revolution of 360 degrees.

2. The articulated fitting according to claim 1, wherein the transmission rod has a square cross section with a missing corner, where the circumference of the cross section follows a core circle at this location and the sides of the square are tangential to this core circle, and the cross section of the recess of the swivel axle is constructed so as to match the cross section of the transmission rod.

3. The articulated fitting according to claim 1, wherein the transmission rod has a hexagonal cross section, where one corner of the hexagon is removed and the circumference of the cross section follows a core circle at this location, the sides of the hexagon being tangential to this core circle and the cross section of the recess of the swivel axle is constructed to match the cross section of the transmission rod.

4. The articulated fitting according to claim 1, wherein the transmission rod is constructed as a serrated shaft in which one serration is omitted and the serrated shaft is constructed at this location as a circular arc which is identical to the base circle of the serration, and the cross section of the recess of the swivel axle is constructed so as to match the cross section of the transmission rod.

5. The articulated fitting according to claim 1, wherein the transmission rod is constructed as a spline shaft, wherein, at a location on the circumference, the center distance of two adjacent tooth strips corresponds to twice the spacing distance of the rest of the strips, and wherein the grooves of the recess of the swivel axle are arranged in the same manner as the tooth strips of the spline shaft to receive these tooth strips.

6. The articulated fitting according to claim 1, wherein the recess of the swivel axle penetrates a hub of a driver for insertion of the transmission rod.

7. The articulated fitting of claim 1, wherein the hub of a driving member, which hub is attached to the transmission rod, is provided with the whole, unaltered profile cross section in the form of a a toothed circumference having all of its teeth.

8. In an articulated fitting for seats having an adjustable backrest, in particular motor vehicle seats, in which a stationary articulated part associated with the seat part and a swivelable articulated part associated with the backrest are connected with one another via a swivel axle, having an adjusting and fixing device which determines the position of both articulated parts relative to one another and is constructed as a gear unit, the swivel axle of each articulated fitting having a central recess or receptacle serving to connect with a transmission rod so as to be fixed with respect to rotation relative thereto, which transmission rod couples the two articulated fittings of a seat with one another, the improvement comprising:

that the transmission rod and the recess of the swivel axel, which recess receives the transmission rod so as to be fixed with respect to rotation relative thereto, have a profile cross section in the shape of a polygonal or toothed circumference having a missing corner or tooth, respectively, at a location on the circumference, this location on the circumference being reduced to a core cross section of said transmission rod so that the transmission rod may be inserted into the recess of the swivel axel after a complete revolution of 360 degrees, wherein the transmission rod has a square cross section with a missing corner, where the circumference of the cross section follows a core circle at this location and the sides of the square are tangential to the core circle, and the cross section of the recess of the swivel axel is constructed so as to match the cross section of the transmission rod.

9. In an articulated fitting for seats having an adjustable backrest, in particular motor vehicle seats, in which a stationary articulated part associated with the seat part and a swivelable articulated part associated with the backrest are connected with one another via a swivel axle, having an adjusting and fixing device which determines the position of both articulated parts relative to one another and is constructed as a gear unit, the swivel axle of each articulated fitting having a central recess or receptacle serving to connect with a transmission rod so as to be fixed with respect to rotation relative thereto, which transmission rod couples the two articulated fittings of a seat with one another, the improvement comprising:

that the transmission rod and the recess of the swivel axel, which recess receives the transmission rod so as to be fixed with respect to rotation relative thereto, have a profile cross section in the shape of a polygonal or toothed circumference having a missing corner or tooth, respectively, at a location on the circumference, this location on the circumference being reduced to a core cross section of said transmission rod so that the transmission rod may be inserted into the recess of the swivel axel after a complete revolution of 360 degrees, wherein the transmission rod has a hexagonal cross section, where one corner of the hexagon is removed and the circumference of the cross section follows a core circle at this location, the sides of the hexagon being tangential to this core circle and the cross section of the recess of the swivel axel is constructed to match the cross section of the transmission rod.

10. In an articulated fitting for seats having an adjustable backrest, in particular motor vehicle seats, in which a stationary articulated part associated with the seat part and a swivelable articulated part associated with the backrest are connected with one another via a swivel axle, having an adjusting and fixing device which determines the position of both articulated parts relative to one another and is constructed as a gear unit, the swivel axle of each articulated fitting having a central recess or receptacle serving to connect with a transmission rod so as to be fixed with respect to rotation relative thereto, which transmission rod couples the two articulated fittings of a seat with one another, the improvement comprising:

that the transmission rod and the recess of the swivel axel, which recess receives the transmission rod so as to be fixed with respect to rotation relative thereto, have a profile cross section in the shape of a polygonal or toothed circumference having a missing corner or tooth, respectively, at a location on the circumference, this location on the circumference being reduced to a core cross section of said transmission rod so that the transmission rod may be inserted into the recess of the swivel axel after a complete revolution of 360 degrees, wherein the transmission rod is constructed as a spline shaft, wherein, at a location on the circumference, the center distance of the two adjacent tooth strips corresponds to twice the spacing distance of the rest of the strips, and wherein the grooves of the recess of the swivel axel are arranged in the same manner as the tooth strips of the spline shaft to receive these tooth strips.

* * * * *